Figure 1:
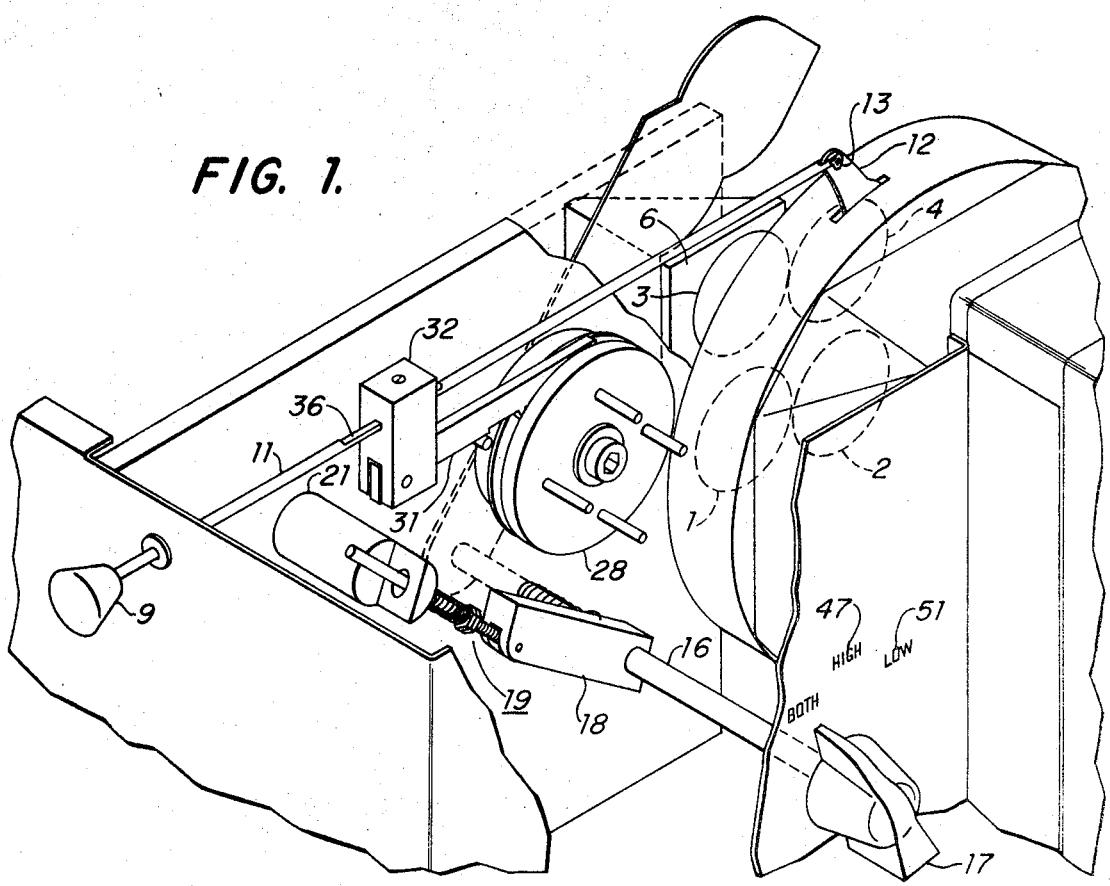

United States Patent
Macone et al.

[15] 3,687,040
[45] Aug. 29, 1972

[54] EXPOSURE CONTROL SYSTEM WHICH ELIMINATES DOUBLE EXPOSURES IN A MULTIPLE IMAGE CAMERA

[72] Inventors: Fredrick W. Macone, Carlisle; Normand J. La Fortune, Dracut, both of Mass.

[73] Assignee: Avant Incorporated, Lincoln, Mass.

[22] Filed: May 5, 1970

[21] Appl. No.: 34,649

[52] U.S. Cl. ............................................... 95/36 R
[51] Int. Cl. ............................................ G03b 19/02
[58] Field of Search .................................. 95/1.1, 36

[56] References Cited

UNITED STATES PATENTS

| | | | |
|---|---|---|---|
| 3,345,924 | 10/1967 | Kitrosser | 95/1.1 |
| 3,540,362 | 11/1970 | Macone | 95/36 |
| 3,182,400 | 5/1965 | Nyc | 95/36 X |
| 3,443,499 | 5/1969 | Gianino | 95/36 X |
| 3,504,607 | 4/1970 | Bok | 95/36 X |

*Primary Examiner*—Samuel S. Matthews
*Assistant Examiner*—Monroe H. Hayes
*Attorney*—Robert L. Nathans

[57] ABSTRACT

A camera exposure control system for sequentially exposing first and second areas of a photosensitive medium positioned within the imaging plane of a multiple image camera. The exposure control system disclosed herein enables the simultaneous exposure of a plurality of areas of photosensitive film or in an alternate mode of operation utilizes means for sequentially shifting the position of a movable masking member to alternately cover a first lens system upon the actuation of a shutter and thereafter for covering a second lens system upon a second actuation of the shutter. The alternate movement back and forth of the masking member to alternately cover the first and second lens systems is automatic so that inadvertent double exposure of one area of the film is automatically prevented.

9 Claims, 4 Drawing Figures

Patented Aug. 29, 1972

3,687,040

2 Sheets-Sheet 1

FREDERICK W. MACONE
NORMAND LAFORTUNE
INVENTORS

BY Robert J. Nathans

ATTORNEY

FREDERICK W. MACONE
NORMAND LAFORTUNE
INVENTORS

EXPOSURE CONTROL SYSTEM WHICH ELIMINATES DOUBLE EXPOSURES IN A MULTIPLE IMAGE CAMERA

BACKGROUND OF THE INVENTION

This invention relates to the field of multiple image cameras and more particularly relates to a system for sequentially exposing different areas of photographic film without double exposure of any one area.

In U. S. Pat. No. 3,128,685 of S. Kitrosser, assigned as the same assignee as the assignee of the present invention, a multiple image camera is disclosed for simultaneously photographing four images of a given subject upon photographic film. This type of a camera is utilized for making I.D. cards, credit cards, or badges. In U.S. Pat. No. 3,345,924 of S. Kitrosser, assigned to the same assignee as the present invention, a first lens system, preferably utilizing twin lenses, is utilized to photograph an image of a subject seated before the camera and for simultaneously photographing a data card so that a composite photographic image is photographed on one area of the film. In one mode of operation, the first lens system photographs the image of a first data card and simultaneously photographs an image of a first subject to form the composite I.D. card image on a first half of the film. A second subject, together with his associated data card which differs from the first data card, is simultaneously photographed on the remaining second area of the film. This may be designated as the alternate mode of operation. It is often desirable, however, to simultaneously project two composite images on both areas of the film where a duplicate is to be retained. This mode of operation may be termed the simultaneous mode.

In the first mentioned patent (3,128,685), four images of a subject are usually simultaneously photographed upon four subareas of the film. However, it may be desirable to reserve two quadrants of the film for a first subject and the remaining two quadrants of the film for a second subject as in the case of the aforementioned Pat. No. 3,345,924. The exposure control system of the present invention may be utilized in both types of cameras where the alternate mode of operation is desirable. In the past, the operator manually shifted a movable masking member to first cover one set of lenses during a first actuation of the shutter and thereafter manually shifted the movable masking member to cover a second set of lenses before the second actuation of the shutter. If the operator forgot to actuate the movable masking member between the first and second shutter actuations, a double exposure would result. Such double exposure presents a serious problem, because two subjects being photographed in the alternate mode would have to be recalled back to the area where the camera is situated. Such action is inconvenient and wasteful of time, money, and film. In the case of a busy businessman who, for example, would have to be recalled to a bank issuing a credit card for his account, such recall could result in the loss of credit card business.

SUMMARY OF THE INVENTION

In accordance with a preferred embodiment of the present invention, an exposure control system alternately causes first and second lens systems to be covered by a movable masking member upon each actuation of the shutter, so that a first area of the film is exposed upon the first actuation of the shutter and a second area of the film is thereafter automatically exposed upon the second actuation of the shutter. A novel movable masking member positioning means including a cam and cam follower, is driven by a shutter actuating means, so that upon each actuation of the shutter, the movable masking member is alternately shifted in position. Means are provided for operating the exposure control system in the simultaneous mode rather than the alternate mode and consists of an arrangement for moving the masking member to a position whereby the member does not cover any of the lenses upon a single or multiple actuation of the shutter.

Figure 2:
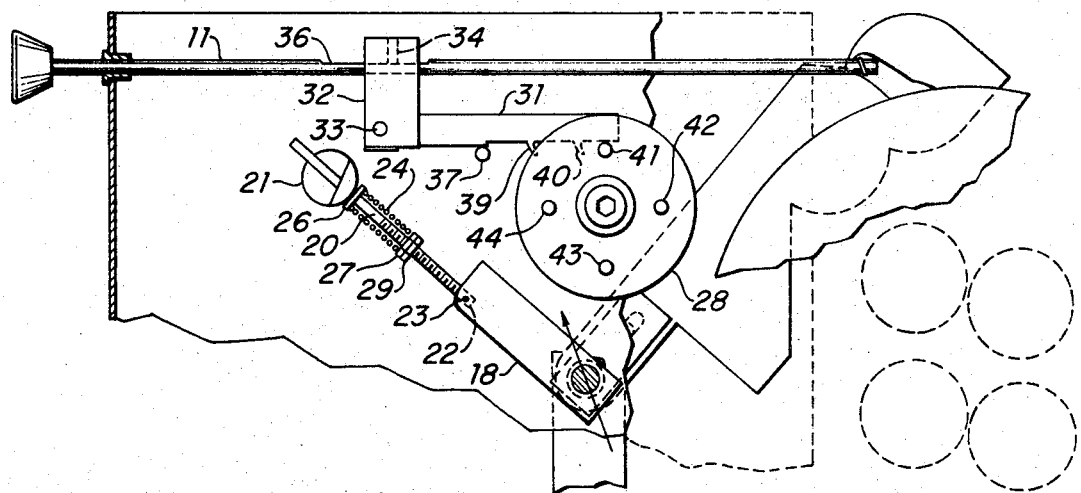
Figure 3:
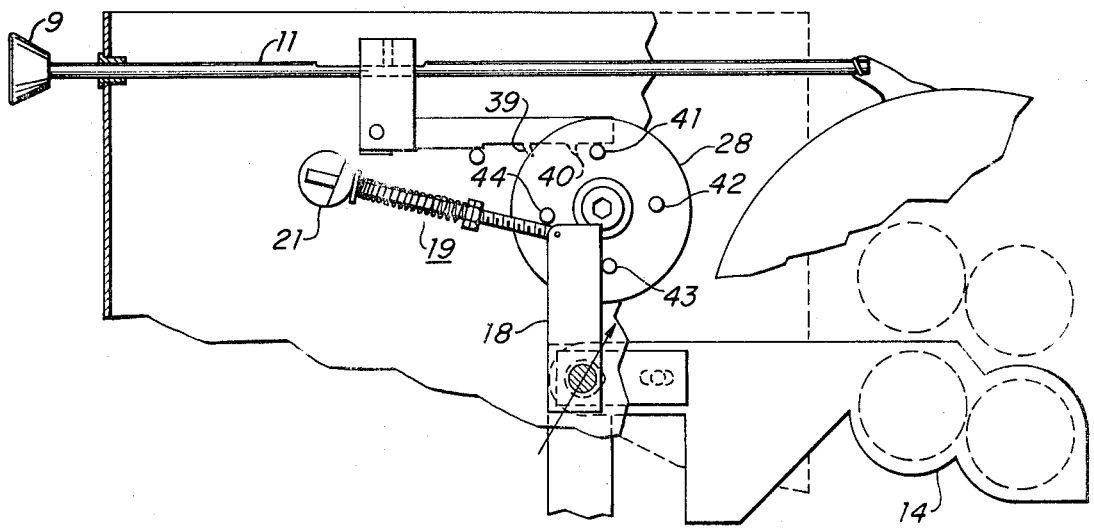
Figure 4:
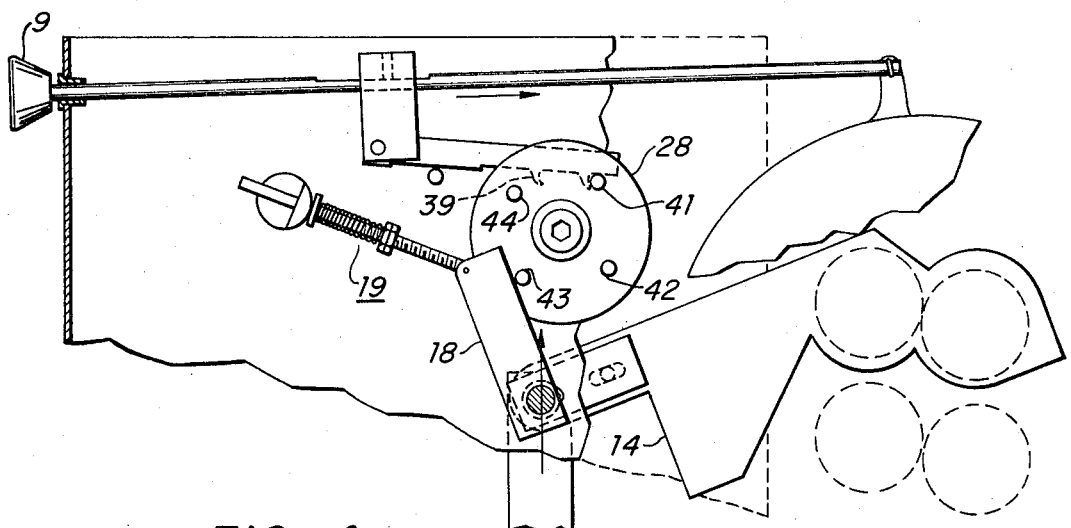

Other objects, features, and advantages of the present invention will become apparent upon the inspection of the following specific description taken together with the drawings in which:

FIG. 1 discloses a perspective view of the control system;

FIG. 2 discloses a front view of the control system where the system is set in the simultaneous mode;

FIG. 3 discloses a front view of the system where the system is set in the alternate mode for exposure of the first lens system;

FIG. 4 discloses the control system set in the alternate mode of operation for exposure of the second lens system.

SPECIFIC DESCRIPTION OF THE PREFERRED EMBODIMENT

Referring now to FIG. 1, a first lens system comprising lenses 1 and 2 is disclosed together with a second lens system comprising lenses 3 and 4. These lenses are positioned within lens barrels not shown, each of which is fitted into lens board 6. The lens board could merely consist of apertures and the lens could be located at another portion of the camera if desired. In the interest of clarity, all portions of the camera are not shown, but all elements essential to the invention have been included. For further details, reference may be made to the aforesaid U.S. Pat. No. 3,345,924, in which lens 17a corresponds to lens 4, lens 16a corresponds to lens 3, lens 16b corresponds to lens 1, and lens 17b corresponds to lens 2. Lenses 1 and 3 focus an image of a data bearing card inserted into the camera upon the imaging plane within film pack 7, while lenses 2 and 4 focus an image of an individual seated before the camera upon the imaging plane. Shutter 8 is actuated by the operator pushing on knob 9 fixed to an elongated rod 11 which in turn is coupled to a shutter actuating lever 12 via pin 13. This structure comprises the shutter actuating means of the present invention. Movable masking member 14 is coupled to a rotatable rod 16 which is actuated by the operator by means of knob 17. When it is desirable to simultaneously photograph two composite images, each of which includes a photograph of a subject and a photograph of the data card, knob 17 is positioned as shown in FIG. 1 which positions movable masking member 14 at a position wherein it does not cover any of the lenses. An elongated cam follower 18 is also coupled to rod 16 and is spring biased by biasing means 19 in the position shown in FIGS. 1 and 2. Cam follower biasing means 19 includes a threaded shaft 20 which is slideably positioned within rotatable post 21 as shown. The threaded shaft is flattened at 22 and a pin 23 is passed through the flattened portion of the biasing means and further passes through cam follower 18 as shown. Thus, the lower end of threaded shaft 20 is pivotably coupled to elongated cam follower 18. Spring 24 contacts a washer 26 and an adjusting nut 27. Adjusting nut 27 is positioned upon the threaded shaft 20 to place the spring in compression so that a biasing force is applied along the longitudinal axis of threaded shaft 20 which locks the cam follower in a position wherein it does not coact with cam 28. A locking nut 29 is positioned against adjusting nut 27 after the desired degree of compression is induced into spring 24.

Shutter actuating rod 11 is coupled to cam driver element 31 by means of coupling member 32. Cam driver 31 is pivotably coupled to member 32 by pin 33. A set screw 34 passes through a threaded hole at the upper portion of element 32 and bears against a flattened portion 36 of rod 11. Downward motion of cam driver 31 is inhibited by pin 37. Longitudinal positioning of the cam driver is thus effected by loosening set screw 34 and moving element 32 with respect to shutter actuating rod 11. Actuation of rod 11 to the right causes one of the teeth 39 or 40 to rotate cam 28 through a 45° angle. This is effected by the pushing action of one of the teeth against one of the elongated pins 41, 42, 43, or 44. In the aforesaid simultaneous mode of operation, cam follower 18 is positioned as shown in FIGS. 1 and 2 and is unaffected by the rotation of cam 28 which is caused by successive actuations of the shutter by longitudinal movement of rod 11 and cam driver 31. Movable masking member 14 in the simultaneous mode is thus positioned as shown during successive shutter actuations and is not moved. It should now be apparent that the entire area of the film is exposed in the simultaneous mode upon each actuation of the shutter and a duplicate composite I.D. card image is photographed. The film obviously is removed after each actuation of the shutter in the simultaneous mode.

Let it now be assumed that the operator desires the camera to operate in the aforesaid alternate mode of operation which produces two composite images on the film of two different subjects, each of which has an individual data card.

When the operator switches into the alternate mode of operation, he rotates knob 17 so that the point of the knob is opposite indicia 51 labeled "low." This causes movable masking member 14 to assume the low position which covers the aforesaid first lens system as shown in FIG. 3. Cam follower 18 is forced against pin 43 by the biasing means 19 which assumes the position shown in FIG. 3 owing to its pivotable relationship with rotatable post 21 and cam follower 18. As the operator commences to move shutter actuating rod 11 to the right, tooth 40 pushes pin 41 which in turn causes counter clockwise rotation of cam follower 18 due to actuation of pin 43 in turn caused by rotation of cam 28. This causes the movable masking member to cover the upper or second lens system. After the second lens system is fully covered by masking member 14, the shutter opens and light passes through the lower or first lens system to expose half of the film. At this point, the system assumes the position shown in FIG. 4 and the reaction force applied by pin 43 against the cam follower 18 is such that the device is locked in the position shown in FIG. 4. The angular relationship of the working surface of cam follower 18 with respect to pin 43 prevents counter clockwise rotation of cam 28. In this position, the pointer of knob 17 is adjacent the "high" indicia 47. Rod 11 is displaced to the left by the spring in the shutter cock and the stage is set for the exposure of the remaining unexposed portion of the film. Another subject is seated before the camera and the first subject's data card is removed while the second subject's data card is inserted into the camera. The operator pushes against knob 9 and tooth 39 rather than tooth 40 causes a second 45° rotation of cam 28. At the commencement of this rotation, cam driver 18 is moved clockwise until pin 43 clears the working surface of the cam follower. Just after this occurs, biasing means 19 abruptly drives cam driver 18 and masking member 14 in a counter clockwise direction and the lower lens system is covered by the masking member. At this time, the shutter is again actuated to cause light to pass through the upper lens system to photograph the second composite image upon the film. The system now again assumes the position shown in FIG. 3. The fully exposed film is now removed from the camera and the stage is set for another cycle. The foregoing procedure might be reversed if cam 28 happens to be in the position shown in FIG. 4 at the time the operator switches into the alternate mode. In this case, the second lens system will be uncovered before the first lens system.

It should now be apparent that in the alternate mode of operation, the movable masking member is alternated back and forth in a manner to uncover the first and second lens systems sequentially. It is important to stress that since the actuation of the masking member is automatically effected by the shutter actuating means that the aforesaid wasteful double exposure is impeded, because the operator need not remember to shift the masking member before another picture is taken.

Obviously many modifications and variations of the present invention are possible in the light of the above teachings. It is therefore to be understood, that within the scope of the appended claims, the invention may be practices otherwise than as specifically described.

We claim:

1. In a camera exposure control system for sequentially exposing first and second areas of a photsensitive medium, a system which eliminates double exposure thereof comprising;

a. an imaging platen;
   b. a first lens system for exposing a first area of said photosensitive medium;
   c. a second lens system separate from said first lens system for exposing a second area of said photosensitive medium;
   d. an elongated, noncircular movable masking member for covering said first lens system in a first lens covering position and said second lens system in a second lens covering position;
   e. shutter means coacting with said first and second lens systems for exposing said photosensitive medium;
   f. shutter actuating means for actuating said shutter means;

g. masking member positioning means for positioning said masking member in lens covering positions remote from said imaging platen and being coupled to said shutter actuating means for shifting the position of said movable masking member from one lens system to another lens system upon the actuation of said shutter actuating means to prevent double exposure of exposed areas of said photosensitive medium;

h. means for supporting said masking member positioning means at a location upon said camera position remotely from said first and second lens systems to provide for easy access to said masking member positioning means;

i. said masking member positioning means further including a cam follower coupled to said movable masking member, a cam for actuating said cam follower and a cam driver coupled to said shutter actuating means for actuating said cam upon actuation of said shutter actuating means; and j. means for mechanically biasing said cam follower against said cam, said cam further comprising a plurality of elongated members separated from each other which are positioned transversely to the direction of motion of said cam and which drive said masking member via said cam follower between said first and second lens covering positions upon the actuation of said shutter actuating means.

2. The combination as set forth in claim 1 wherein said cam driver includes an elongated member having a plurality of teeth thereon which drive said elongated members and hence said cam through a given angle each time said shutter actuating means is actuated.

3. The combination as set forth in claim 2 further including means for positioning said movable masking member in non-coacting relation with both of said lens systems and for decoupling said masking member positioning means from said shutter actuating means.

4. In a camera exposure control system for sequentially exposing first and second area of a photosensitive medium, a system which eliminates double exposures thereof comprising:

a camera frame;
a first lens system for exposing a first area of said photosensitive medium;
a second lens system for exposing a second area of said photosensitive medium;
a shutter device coacting with said first and second lens systems for exposing said photosensitive medium;
shutter actuating means for actuating said shutter;
a movable masking member for selectively covering one of said lens systems at a time, a cam, a cam follower, means for coupling said movable masking member to said cam follower;
biasing means for mechanically biasing said cam follower against said cam, first coupling means for pivotally coupling one end of said biasing means to said camera and second coupling means for pivotally coupling the other end of said biasing means to said cam follower; and
a cam driver for rotating said cam upon the actuation of said shutter actuating means.

5. The combination as set forth in claim 4 further including means for adjusting the position of said cam driver with respect to said shutter actuating means coupled thereto.

6. The combination as set forth in claim 4 wherein said means for coupling said movable masking member to said cam follower includes a rotatable shaft having a positioning knob coupled thereto for facilitating the manual positioning of said movable masking member.

7. The combination as set forth in claim 4 wherein said first coupling means comprises a post rotatably mounted to said camera frame, said post having a hole therein for slideably accommodating one end of said biasing means to enable said biasing means to shift its position with respect to said post as said cam follower shifts its position.

8. The combination as set forth in claim 4 wherein said cam driver includes a toothed member pivotably coupled to said shutter actuating means and positioned to enable each tooth to alternately drive said cam and rotate it through a predetermined angle.

9. The combination as set forth in claim 4 wherein said biasing means further comprises a threaded rod surrounded by a spring which bears against a nut positioned upon said threaded rod.

* * * * *